United States Patent [19]

Bornhorst, Jr. et al.

[11] Patent Number: 5,947,020
[45] Date of Patent: Sep. 7, 1999

[54] SYSTEM AND METHOD FOR ENGRAVING A PLURALITY OF ENGRAVED AREAS DEFINING DIFFERENT SCREENS

[75] Inventors: Kenneth F. Bornhorst, Jr., Centerville; Richard H. Dunnington, Dayton; David R. Seitz, Vandalia; Curtis Woods, Centerville, all of Ohio

[73] Assignee: Ohio Electronic Engravers, Inc., Dayton, Ohio

[21] Appl. No.: 08/986,578

[22] Filed: Dec. 5, 1997

[51] Int. Cl.$^6$ ........................................ B41F 1/07
[52] U.S. Cl. ............................................ 101/32; 358/299
[58] Field of Search ............................. 101/32, 485, 486, 101/401.1; 358/299, 297, 477, 478; 395/288; 409/109

[56] References Cited

U.S. PATENT DOCUMENTS

| | | | |
|---|---|---|---|
| 4,357,633 | 11/1982 | Buechler | 358/299 |
| 4,438,460 | 3/1984 | Buechler | 358/299 |

(List continued on next page.)

FOREIGN PATENT DOCUMENTS 19612100  10/1997  Germany .

OTHER PUBLICATIONS

"HelioKlischograph K301 and K302 for Magazine Gravure Printing", Dr.–Ing. Rudolf Hell GmbH, P.O. Box 6229, D–2300 Kiel 12. Germany, undated publication.

"HelioKlischograph K406–The Digital Engraver in the HelioPublication System", Hell Gravure Systems GmbH, D–24107 Kiel, Siemenswall, Germany, undated publication.

"Helio Packaging. The reliable digital production line–single repeat, complete forme, forme proof, cylinder engraving", Linotype–Hell AG, Kiel Plant, Siemenswall, D–24107 Kiel, Germany, undated publication.

"Datwyler Laserstar", MDC Max Daetwyler Corp., Reese Blvd. West, Huntersville, NC 28078–13420, undated brochure.

"AABACH Graphic Systems, Your Straight–Through Key to Cylinder–engraving", Porschestrasse Be 13, D–48712 Gescher, Germany, undated.

"DIGILAS System Options for the Future, Laser Technique for Flexo and Gravure Printing", Schepers Druckformtechnik, Wullener Strasse 60, 48691 Vreden, Germany, undated.

"Laser–to–Plate, Direct Laser Transfer", Saueressig, P.O. Box 1362, Vreden, germany, undated.

(List continued on next page.)

*Primary Examiner*—Eugene Eickholt
*Attorney, Agent, or Firm*—Jacox, Meckstroth & Jenkins

[57] ABSTRACT

An engraving system and method is disclosed having multiple engraving heads wherein the operation of each head is controllable so that a vertical screen and/or horizontal screen may be independently controlled, thereby facilitating enabling each engraving head to engrave in accordance with different screen rulings as may be selected by a user. The engraving system includes a signal generator for controlling the vertical screen by utilizing a plurality of vertical scalers which use a cylinder factor signal corresponding to the rotational position of a cylinder rotatably mounted on the engraver, as well as screen variables, such as a screen angle and a screen ruling, to generate independent vertical scaled or screen signals. These vertical scaled signals are used to independently energize the engraving heads to engrave patterns defining different vertical resolutions or vertical screens. This system and method also discloses a drive system for independently driving the engraving heads using the cylinder factor signal mentioned above and the screen variables which were input by the user to enable the engraving heads to engrave patterns having differing horizontal resolution or horizontal screens. Thus, the method and apparatus enable a user to simultaneously or independently change the vertical screen and horizontal screen and, consequently, the screen ruling for each pattern of engraved areas being engraved.

74 Claims, 9 Drawing Sheets

U.S. PATENT DOCUMENTS

| | | | |
|---|---|---|---|
| 4,450,486 | 5/1984 | Buechler | 101/491 |
| 4,451,856 | 5/1984 | Buechler | 358/299 |
| 4,500,929 | 2/1985 | Buechler | 101/494 |
| 5,029,011 | 7/1991 | Fraser | 358/299 |
| 5,164,285 | 11/1992 | Takakura | 430/307 |
| 5,293,426 | 3/1994 | White et al. | 395/288 |
| 5,329,215 | 7/1994 | Fraser et al. | 318/569 |
| 5,402,246 | 3/1995 | Sietz et al. | 358/299 |
| 5,416,597 | 5/1995 | Mubaslat | 358/299 |
| 5,422,958 | 6/1995 | Wouch et al. | 358/299 |
| 5,424,845 | 6/1995 | Holowko et al. | 358/299 |
| 5,424,846 | 6/1995 | Bornhorst, Jr. et al. | 358/299 |
| 5,438,422 | 8/1995 | Holowko et al. | 358/299 |
| 5,440,398 | 8/1995 | Holowko et al. | 358/299 |
| 5,454,306 | 10/1995 | Fraser et al. | 101/28 |
| 5,475,914 | 12/1995 | Bornhorst, Jr. et al. | 29/560 |
| 5,491,559 | 2/1996 | Buechler | 358/299 |
| 5,492,057 | 2/1996 | Bornhorst, Jr. et al. | 101/32 |
| 5,493,939 | 2/1996 | Bornhorst, Jr. | 82/150 |
| 5,519,502 | 5/1996 | Beckett | 358/299 |
| 5,555,473 | 9/1996 | Sietz et al. | 358/299 |
| 5,583,647 | 12/1996 | Izor et al. | 358/299 |
| 5,617,217 | 4/1997 | Brewer et al. | 358/299 |
| 5,621,533 | 4/1997 | Holowko et al. | 358/299 |
| 5,652,659 | 7/1997 | Bornhorst et al. | 358/299 |
| 5,661,565 | 8/1997 | Bornhorst et al. | 358/299 |
| 5,663,802 | 9/1997 | Beckett et al. | 358/299 |
| 5,663,803 | 9/1997 | Beckett et al. | 358/299 |
| 5,671,063 | 9/1997 | Auberry et al. | 358/299 |
| 5,671,064 | 9/1997 | Buechler | 358/299 |
| 5,675,420 | 10/1997 | Beckett et al. | 358/299 |

OTHER PUBLICATIONS

Think Boomerang Technical Information, Think Laboratory Co., Ltd., 610–1 Umebayashu, Toyofuta Kashiwa–shu, Chiba, japan, undated.

Think Boomerang System, "Rotogravure Cylinder Making System", undated publication.

Think System pamphlet, Laserstream System (Filless gravure cylinder making line), undated.

"Latest News From Engraving Maschine Manufacturers", presentation by Bruck–Service Goerz, Christian Stover, ERA Packaging Division meeting, Sep. 18 & 19, 1996.

"Laserstream Update", Think Laboratory Japan, Gravure Cylinder Manufacture, Mar. 1995, Cooper and Turner Pty. Limited, Australia.

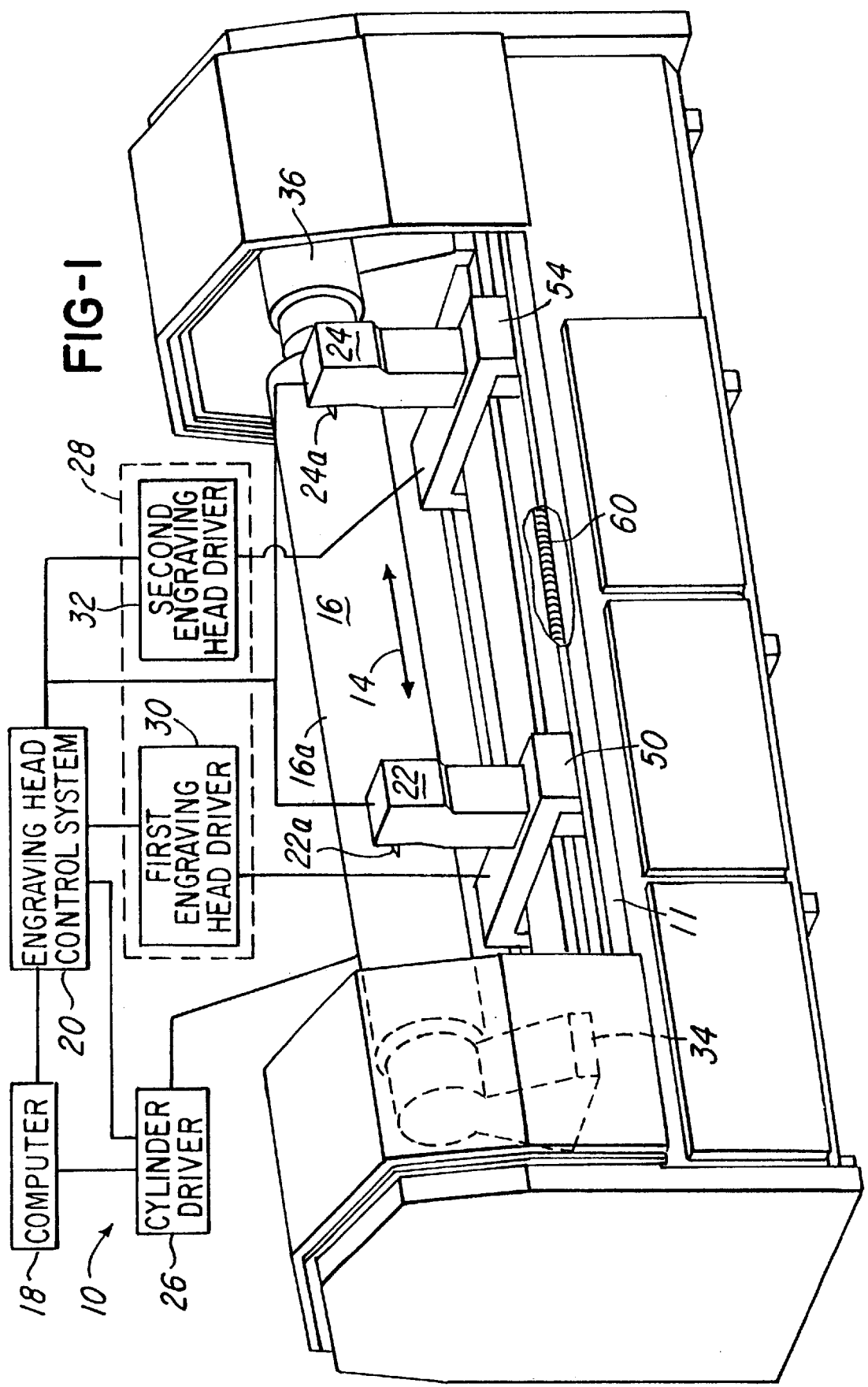

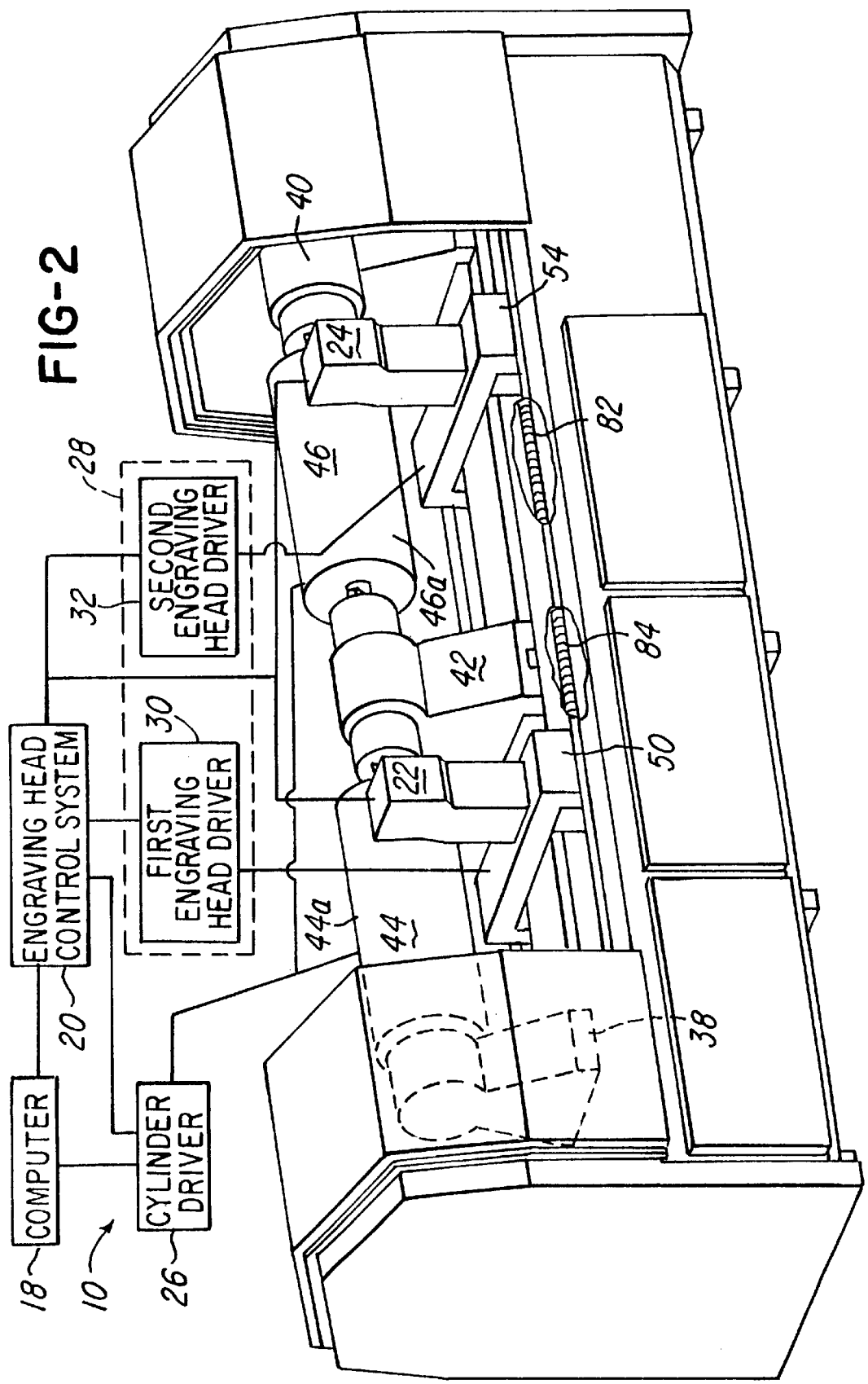

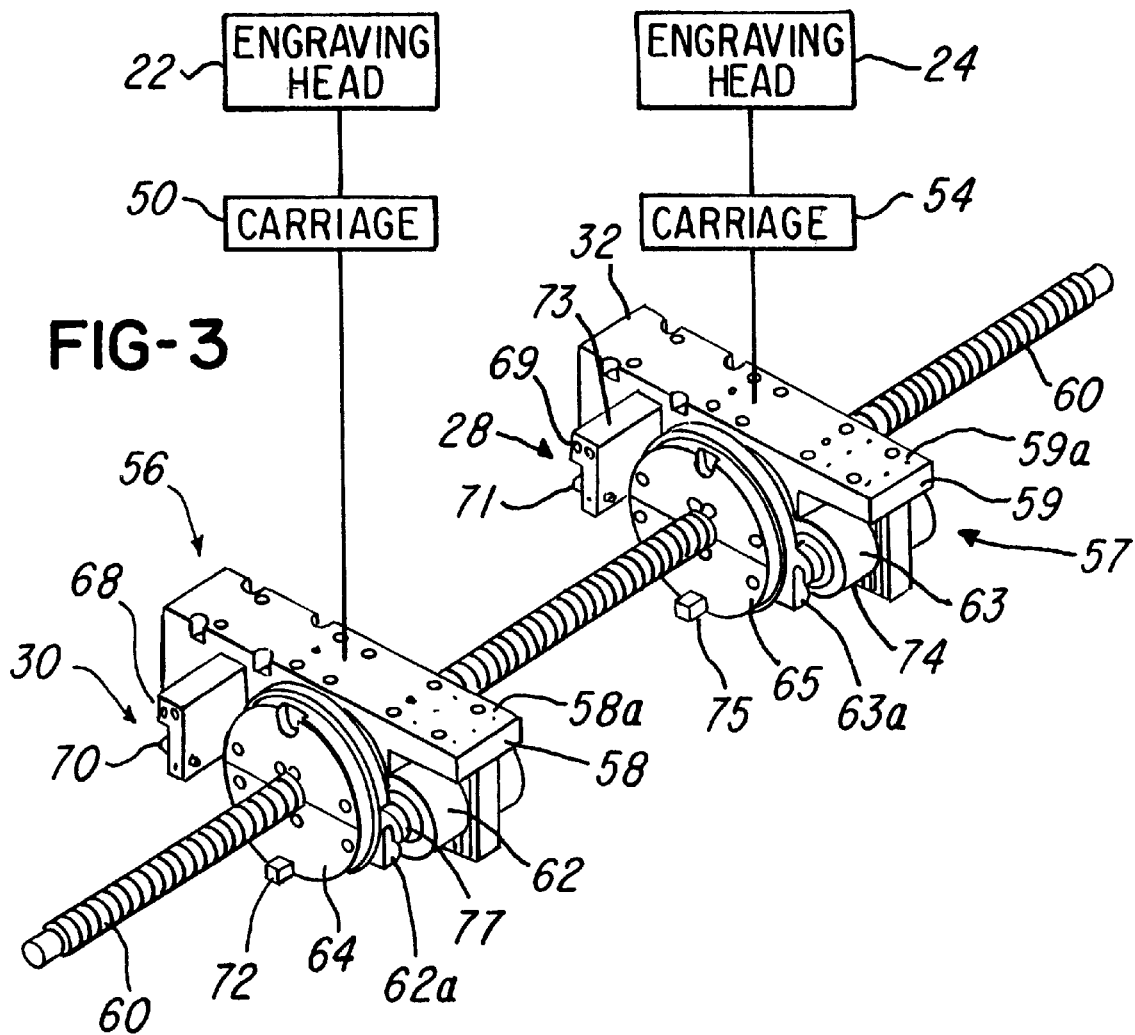
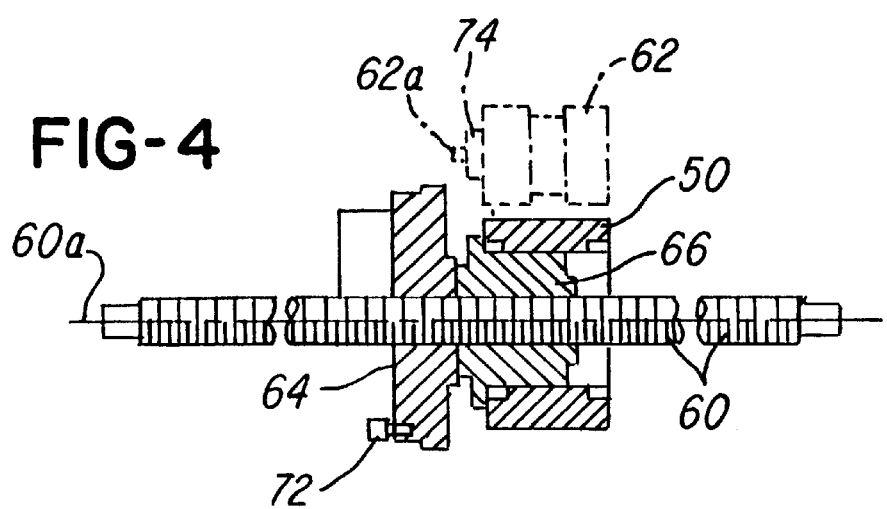

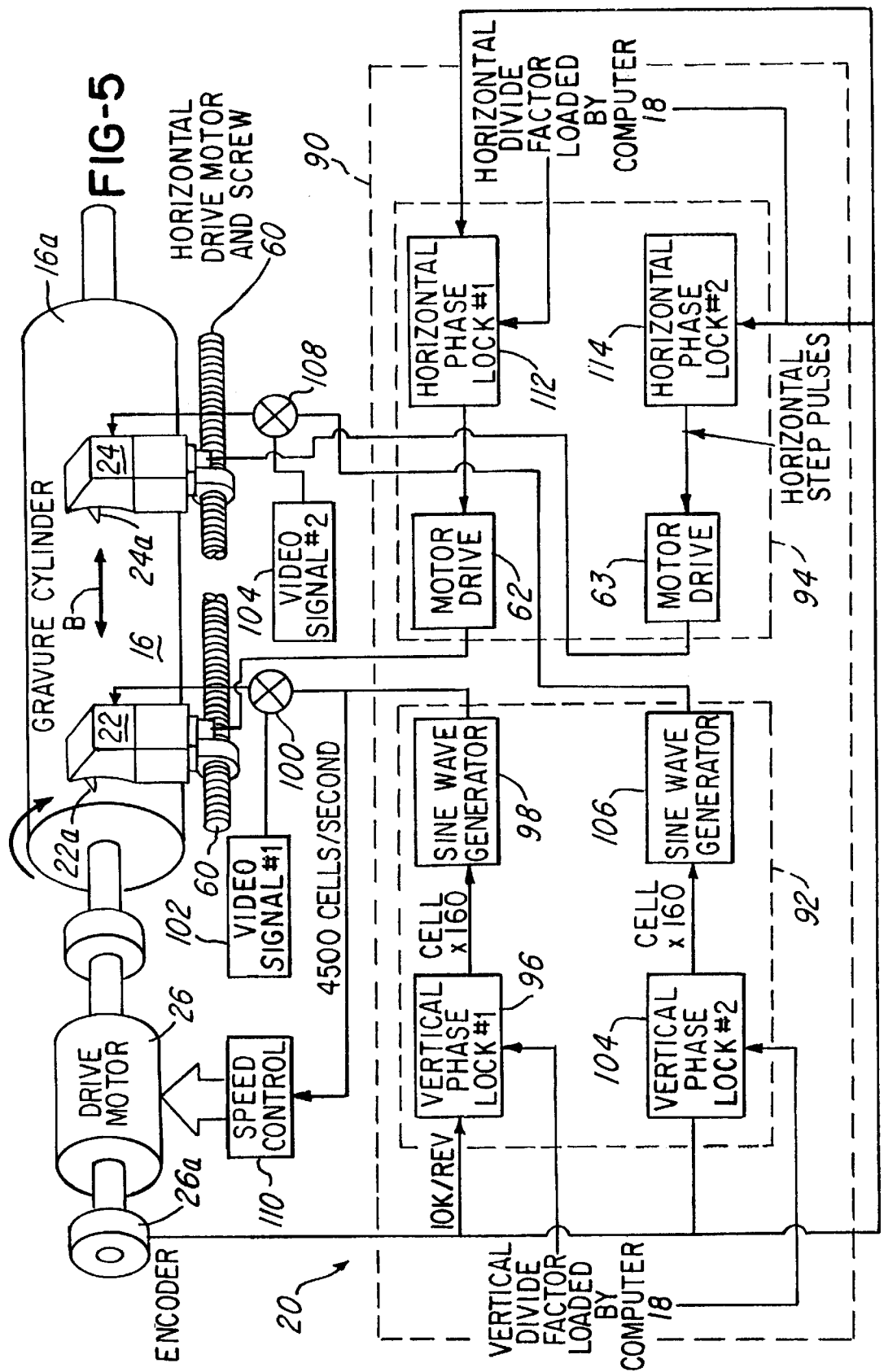

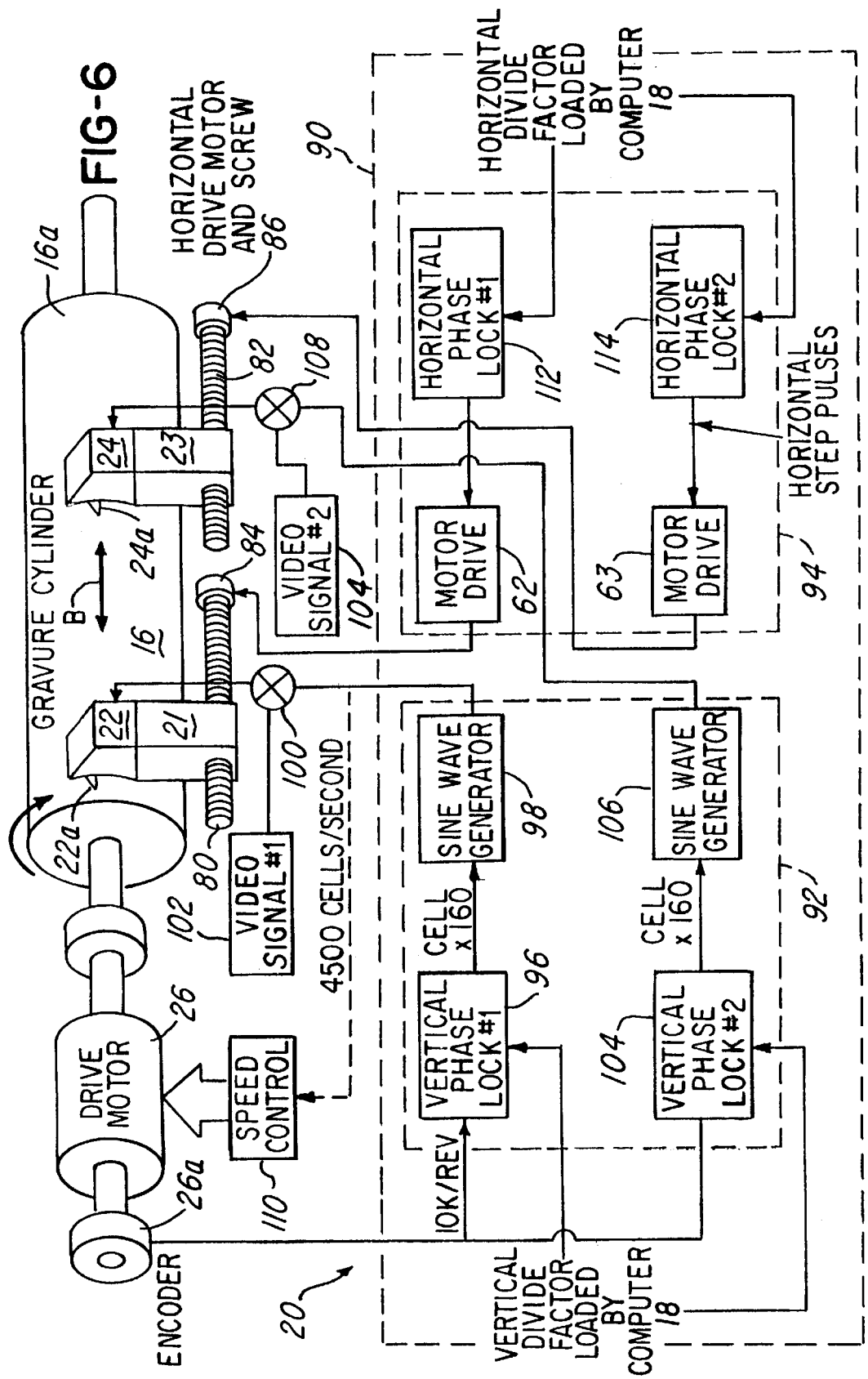

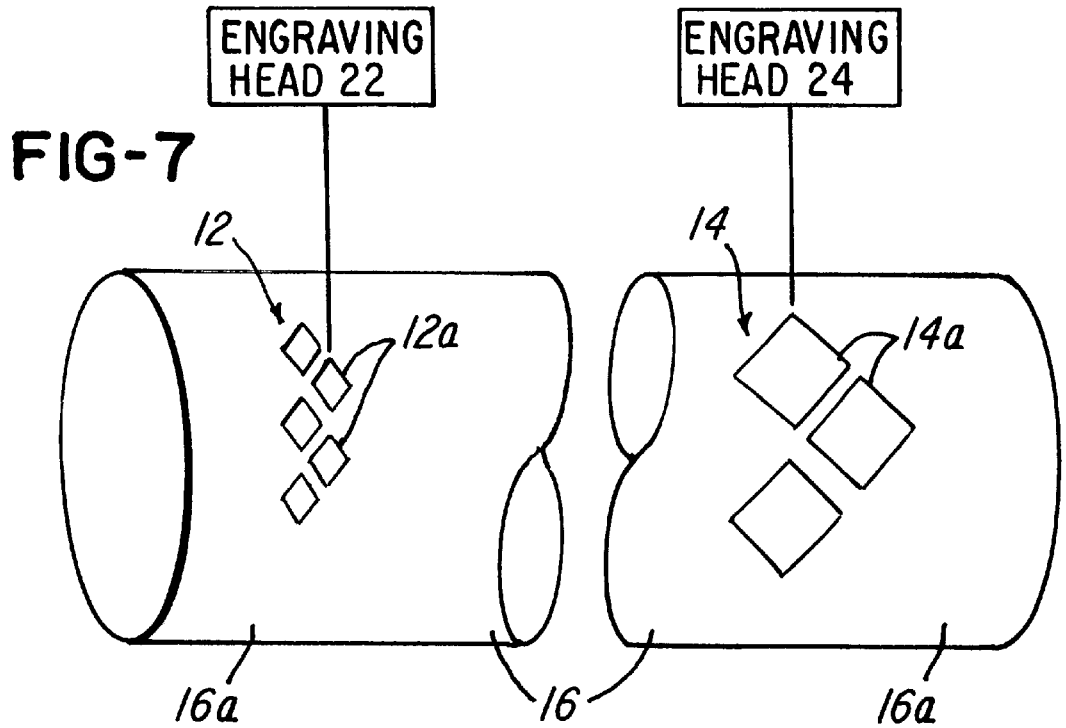
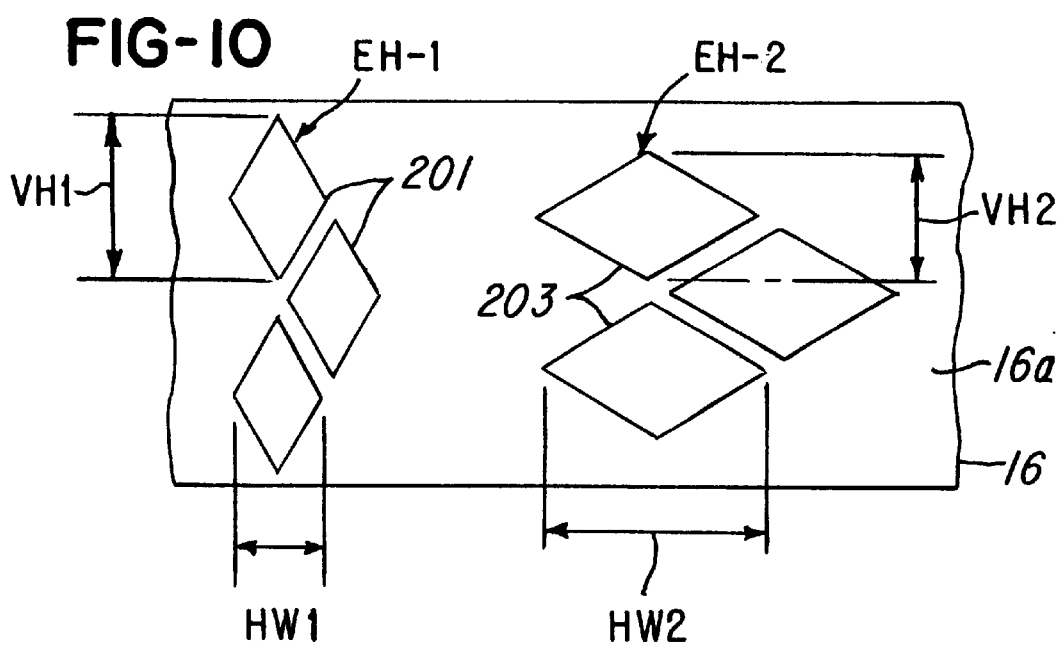

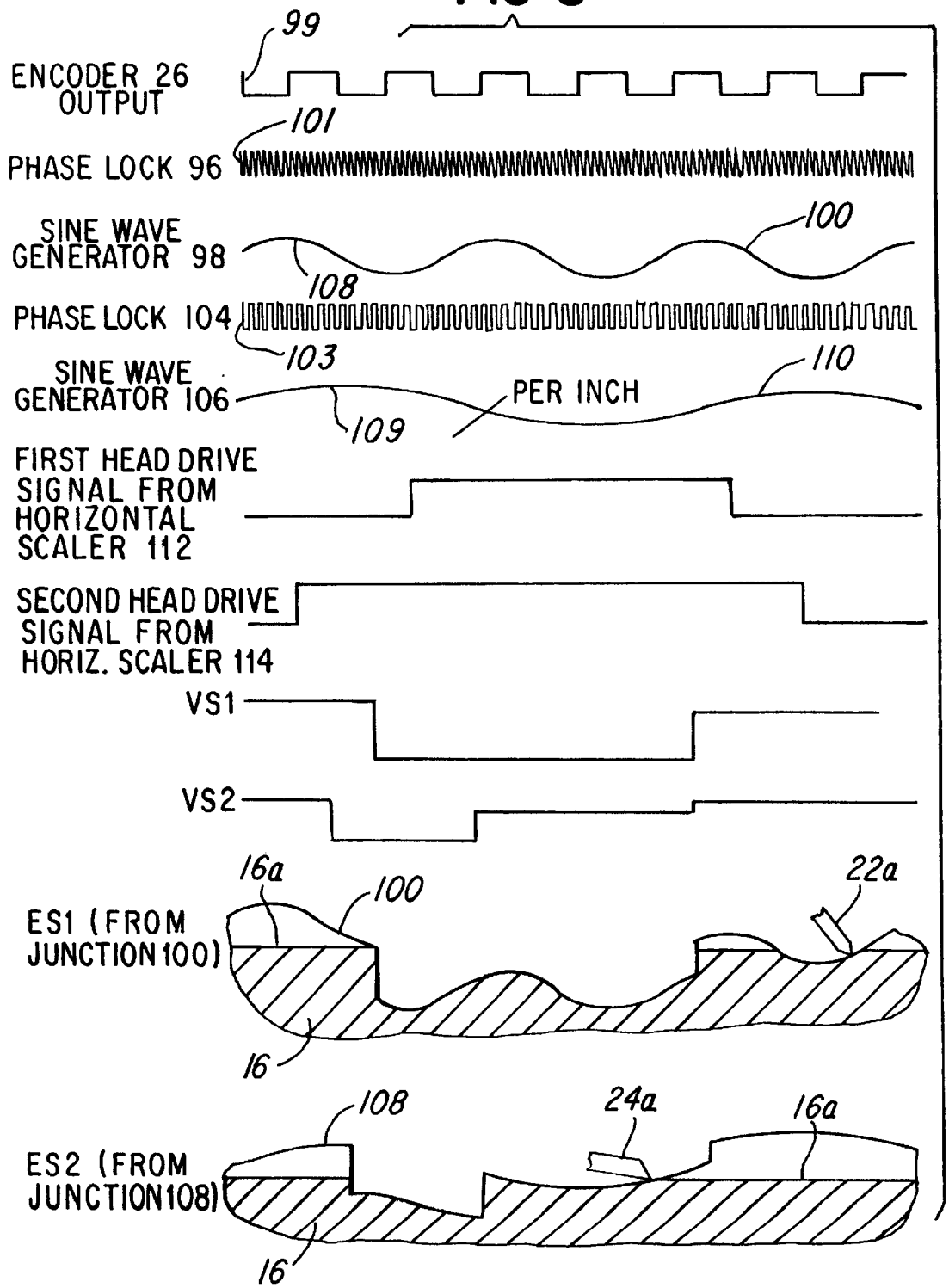

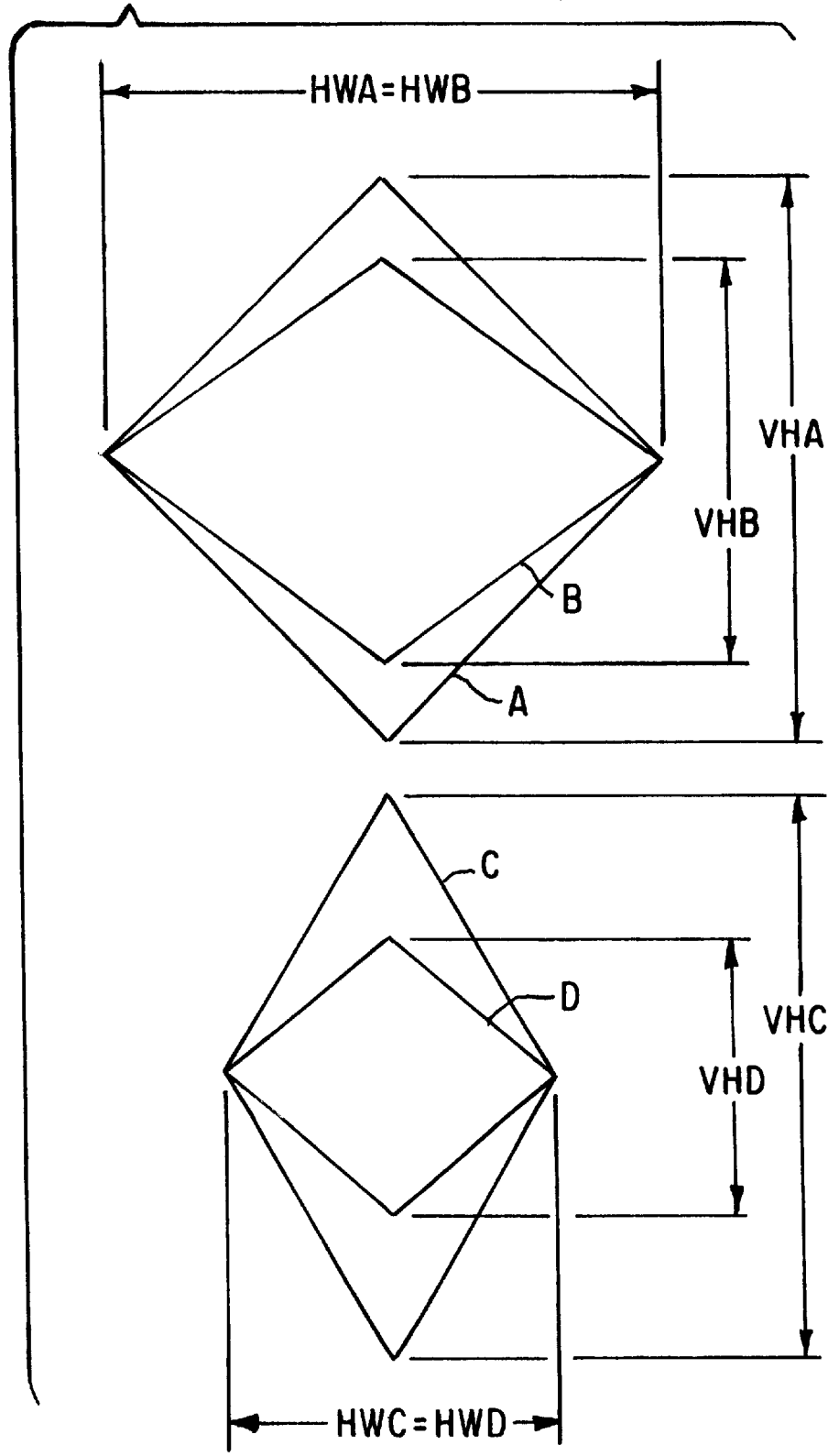

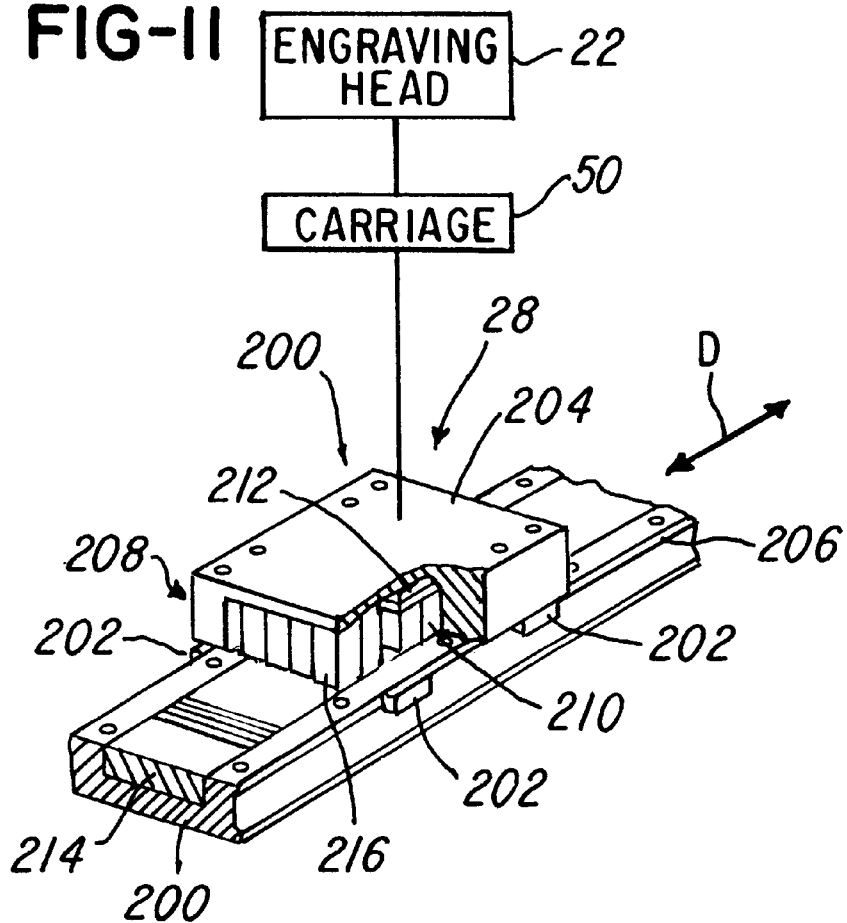
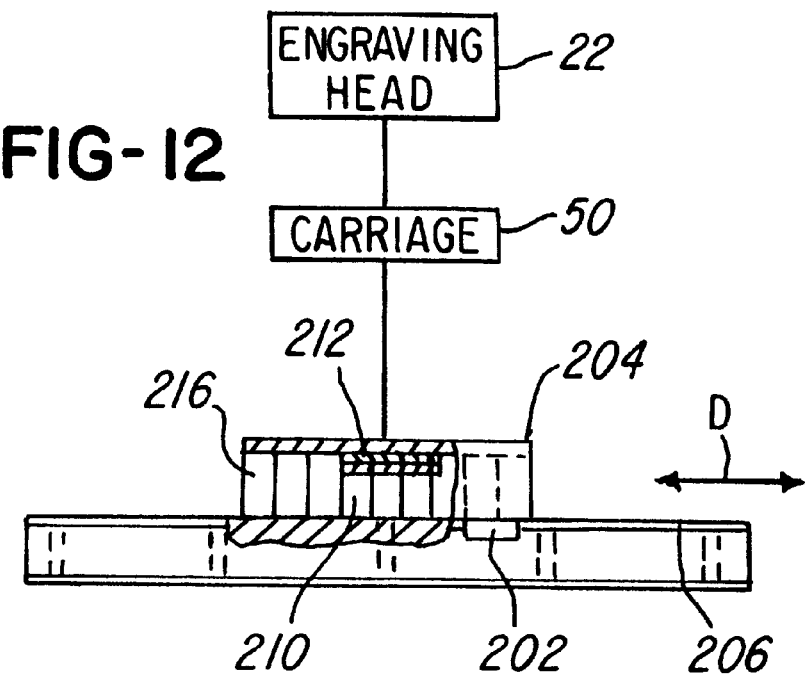

SYSTEM AND METHOD FOR ENGRAVING A PLURALITY OF ENGRAVED AREAS DEFINING DIFFERENT SCREENS

BACKGROUND OF THE INVENTION

1. Field of the Invention

This invention relates to engravers and, more particularly, to an engraving system and method having the capability of engraving a plurality of engraved areas on at least one cylinder using a plurality of engraving heads where the engraved areas define differing screens.

2. Description of the Related Art

This invention relates to engraving of cylinders commonly used in the gravure printing process and specifically to engraving apparatus and methods of the general type disclosed, for example, in U.S. Pat. No's. 4,357,633; 4,438,460; 4,450,486; 4,451,856; 4,500,929; 5,029,011; 5,293,426; 5,402,246; 5,416,597; 5,422,958; 5,424,845; 5,424,846; 5,438,422; 5,440,398; 5,454,306; 5,475,914; 5,491,559; 5,492,057; 5,493,939; 5,519,502; 5,555,473; 5,583,647; 5,617,217; 5,621,533; 5,652,659; 5,661,565; 5,663,802; 5,663,803; 5,671,064; 5,675,420.

The basic principle of electromechanical engraving of the gravure cylinder involves rotating a copper plated cylinder or cylinders while actuating an electronically driven tool or stylus which cuts or engraves vertical columns or lines into the copper surface. The engraved cylinder is normally used in a web type printing press for printing paper, plastics, metallic film material and the like.

In the field of gravure printing, the majority of printed images are screened halftone images. The screened image contains a geometric pattern of dots to represent different gradations of a continuous tone image. As with other forms of halftone gravure, the screen refers generally to the number of cells per square centimeter (i.e., Cell/cm$^2$). When four geometric patterns or screened images, one for each processed color, are superimposed upon each other in register they create a final geometric pattern which, when printed, results in a high-quality image.

The size of any particular engraved area or cell vertically along the direction of cutting (i.e., a cell height) and the size horizontally in the row-to-row direction (i.e., a cell width) are each selected by a user in order to achieve the desired screen and screen angle. Alternatively, the user of a gravure engraver may directly specify both the screen angle and screen (and, hence, the cell parameters, such as width and height) for each color being used in order to alter the screen rotation and population or density of engraved areas or screen ruling.

By properly aligning the screens, a tight geometric configuration and improved printing is achieved. If the screened separations are not rotated at the proper screen angle, a moiré pattern or plaid image effect occurs in the printed image.

Typically, in a four color printing process, a minimum of four gravure cylinders, one for each color, are required. In order to facilitate eliminating undesired moiré effects, each cylinder of a multi-color printing set was engraved with either a different screen and/or different screen angle so that when the patterns overlap moiré effects were reduced or eliminated altogether.

The Helio-Twin™ engraving system offered by Linotype-Hell of Germany, as well as the engraving system model no. B722 offered by Ohio Electronic Engravers, Inc. of Dayton, Ohio, provided engraving systems for simultaneously engraving multiple cylinders. One drawback of these systems was that the engraving heads used to engrave each cylinder were mounted on a common carriage or leadscrew which was driven such that all engraving heads moved across its associated cylinder at the same rate of speed.

Another drawback of the systems offered by Linotype-Hell and Ohio Electronic Engravers is that the cylinders were rotated at the same speed and the heads frequencies were not independently controllably. This, in turn, made it difficult to simultaneously engrave multiple patterns having different vertical screen rulings. Thus, the vertical resolution defined by the vertical screen and the horizontal resolution defined by the horizontal screen for each engraving head were not independently and selectively controllable.

One approach to overcoming the problems with multiple head engraving systems was to vary the frequency of each engraving head. Unfortunately, this only provided the ability to change the vertical resolution or vertical screen for a single head. For example, FIG. 9 illustrates two screen sets (A,B) and (C,D) which illustrate the type of screens engraved with prior art, multi-head engraving systems. In this illustration, screens A and B are engraved on a single engraver by varying the frequency of one of the heads on the engraver. Similarly, C and D are also engraved on a single engraver. Notice that the vertical heights VHA, VHB, VHC, VHD were variable. However, because the engraving heads were driven at the same feed or slew rate, the width HWA associated with screen A was the same as the width HWB associated with screen B and vice versa. Likewise, the width HWC associated with screen C was the same as the width HWD associated with the screen D.

Unfortunately, the area or density of each engraved area represented by screens (A & B) or (C & D) must be different for each screen angle. The engraving heads were not independently controllable on multi-head engravers such that the screen could be kept constant, while the screen angle was varied or vice versa. In addition, the multiple heads were not independently controllable so that the areas or densities engraved by the heads were constant while a screen angle defined by areas engraved by the first head were different from a screen angle defined by areas engraved by the second head.

What is needed, therefore, is a system and method which overcomes the problems of the prior art and which gives the user the ability to selectively and independently engrave a plurality of engraved areas defining different screen rulings and/or wherein the vertical resolution or vertical screen and horizontal resolution or horizontal screen vary between the engraved patterns, despite the fact that the engraving heads are engraving one or more surfaces while the surfaces are rotating at the same speed.

SUMMARY OF THE INVENTION

It is, therefore, a primary object of this invention to provide a system and method which will facilitate engraving a plurality of engraved areas defining different screen rulings.

Another object of the invention is to provide a system and method for engraving a plurality of engraved areas wherein the vertical screen and the horizontal screen differs.

Another object of the invention is to provide an engraving system and method for independently controlling two or more engraving heads by correlating the engraving signal for each engraving head to a cylinder factor, such as cylinder speed or cylinder position.

Still another object of the invention is to provide a system and method for independently controlling the movement of a plurality of engraving heads in order to alter a horizontal screen of two or more engraved areas.

Still another object of the invention is to independently control the movement of a plurality of engraving heads so that the horizontal screen engraved by the engraving heads may be different.

Another object of the invention is to generate a cylinder factor, such as cylinder speed or cylinder position, for use in controlling movement of the engraving heads.

In one aspect, this invention comprises an engraving head control system for independently controlling the operation of each a plurality of engraving heads on an engraver such that the engraving heads can engrave a plurality of patterns, respectively, of engraved areas defining different horizontal widths on at least one cylinder rotatably mounted on the engraver, the engraving head control system comprising a signal generator for generating a plurality of engraving head signals for energizing the plurality of engraving heads to engrave the plurality of patterns in response to a cylinder factor corresponding to at least one cylinder.

In another aspect, this invention comprises a method for simultaneously engraving a first pattern defining a first screen defining a first screen width using a first engraving head and a second pattern defining a second screen defining a second screen width using a second engraving head on at least one cylinder, wherein the first and second screen widths are different, the method comprising the steps of rotatably driving at least one cylinder at a cylinder rate and independently controlling the operation of the first and second engraving heads in response to the cylinder rate in order to effect the simultaneous engraving of the first and second patterns.

Other objects and advantages of the invention will be apparent from the following description, the accompanying drawings, and the appended claims.

BRIEF DESCRIPTION OF ACCOMPANYING DRAWINGS

FIG. 1 is a perspective view of the engraving system for engraving a single cylinder in accordance with one embodiment of the invention;

FIG. 2 is a perspective view of an engraving system in accordance with another embodiment of the invention for engraving multiple cylinders;

FIG. 3 illustrates a drive system for driving a first engraving head and a second engraving head;

FIG. 4 is a fragmentary sectional view illustrating the components of one the drive systems shown in FIG. 3;

FIG. 5 is a schematic view showing details of an engraving head control system used in association with the embodiment shown in FIG. 1;

FIG. 6 is an illustration of another embodiment showing the engraving head control system used with multiple and separately driven leadscrews;

FIG. 7 is a fragmentary sectional view of a cylinder illustrating a first engraved area defining a first screen and a second engraved area defining a second screen;

FIG. 8 is a timing diagram of the various signals generated in accordance with the invention;

FIG. 9 illustrates prior art, overlapped screens A–B and C–D;

FIG. 10 illustrates a plurality of screens engraved in accordance with the method and apparatus of the present invention;

FIG. 11 is a sectional view of another drive system for providing horizontal positioning and velocity control; and FIG. 12 is a fragmentary sectional view of the drive system shown in FIG. 11.

DETAILED DESCRIPTION OF THE PREFERRED EMBODIMENTS

FIG. 1 illustrates an engraving system in accordance with one embodiment of the invention, hereinafter designated as engraving system 10. An object or advantage of this engraving system 10 is that it is capable of engraving a first engraving pattern 12 (FIG. 7) defining a first screen having a first screen ruling and a second pattern 14 defining a second screen having a second screen ruling after the patterns of engraved areas 12 and 14 are engraved on a surface 16a of a cylinder 16 (FIG. 1). It should be appreciated that the first and second screen rulings are different.

As illustrated in FIG. 1, the engraving system 10 comprises an engraving bed 11 for supporting the cylinder 16 and a computer 18 which controls the operation of the engraving system 10. The computer 18 is coupled to an engraving head control system 20 for controlling the operation of both a first engraving head 22 having a stylus 22a mounted on a first carriage 50 and a second engraving head 24 having a stylus 24a mounted on a second carriage such that the first and second engraving heads 22 and 24 engrave the first and second patterns of engraved areas 12 and 14 (FIG. 7), respectively, in the manner described herein. The components of the engraving head control system 20 (FIG. 1) will be described later herein relative to FIGS. 5 and 6.

A cylinder driver 26 for rotatably driving the cylinder 16 such that the rotational movement of the cylinder 16 defines a cylinder variable or factor, such as a cylinder rate or position, which is responsive to a cylinder drive signal from computer 18 and a speed control from a speed control 110 (FIG. 5) of engraving head control system 20. The speed control 110 provides speed control feedback information for precisely controlling the rotational speed of cylinder 16.

The engraving head control system 20 is also coupled to a drive system 28 having a first engraving head driver 30 for driving the first engraving head 22 along the surface 16a of cylinder 16 and parallel to an axis of cylinder 16 (i.e., in the direction of double arrow A in FIG. 1) during engraving. The drive system 28 also comprises a second engraving head driver 32 which operates independent of the first engraving head driver 30 and which is coupled to the second engraving head 24 for engraving the second pattern 14 (FIG. 7) defining the second screen. The engraving head 22 (FIG. 1) comprises an associated first engraving head driver 20, and engraving head 24 comprises a second engraving head driver 32.

The first engraving head driver 30 and second engraving head driver 32 comprise first driving assembly 56 and second drive assembly 57, respectively, of the type illustrated in FIG. 3. In the embodiment shown in FIG. 3, the carriages 50 and 54 are mounted on a common, non-rotating leadscrew 60 with each carriage 50 and 54 being independently controllable as described later herein. In another embodiment, each carriage 50 and 54 are mounted on separately driven leadscrews 80 and 82 as described below relative to FIG. 6.

FIGS. 11 and 12 illustrate another embodiment of the drive system 28 for providing horizontal positioning and velocity control for the first and second engraving heads 22 and 24. This embodiment will be shown and described relative to engraving head 22, but it should be appreciated that the same features may be provided for engraving head 24 and carriage 54 as well.

In this embodiment, the drive system 28 comprises a guide rail 200 which is mounted on the engraving bed 11 (FIG. 1) to define a rail 200 or linear guideway which is generally parallel to the rotational axis of cylinder 16. A plurality of bearing guides 202 are secured to a slider housing 204 and cooperate with a flange 206 on the rail 200 to permit the housing 204 to slide in the direction of double arrow D in FIG. 11. It should be appreciated that the carriage 50 may be mounted directly to the slider housing 204 so that the movement of the carriage 50 and engraving head 22 is directly responsive to the movement of slide housing 204.

The movement of the slider housing 204, carriage 50 and engraving head 22 in the direction of double arrow D is controlled through a linear motor 208 comprising a motor coil 210 and magnet 212 which cooperate and operate with respect to a motor scale 214 which functions similar to a flat motor rotor (not shown). The motor coil 210 is coupled directly to the engraving head control system 20 and is responsive thereto to cause bi-directional movement of carriage 50, based on the polarity of motor coil 210. The position and feedback control of the linear motor 208 is accomplished through the detection of the motor scale 214 via a magnetic resolver 216 having a resolver coil and resolver core (both not shown) which operate in a manner conventionally known.

It should be appreciated that the drive system 28 embodiments shown in the various embodiments described herein may be utilized independently or in combination in order to provide independent controllability of the feed or slew rate of the engraving heads 22 and 24 in order to provide the independent control of the engraving heads 22 and 24 achieved by this invention.

FIG. 2 illustrates another embodiment of the invention with like parts being labeled with the same part numbers. Notice in FIG. 1, that the engraving system 10 comprises a headstock 34 and a tailstock 36 for rotatably supporting a single cylinder 16 on which both engraving heads 22 and 24 operate. In contrast, the engraving system 10 of the embodiment shown in FIG. 2 comprises a headstock 38, tailstock 40 and intermediate support stock 42 situated between the headstock 38 and tailstock 40. The support stock 42 cooperates with the headstock and tailstock 38 and 40 to rotatably support a first cylinder 44 in relationship to the first engraving head 22 and a second cylinder 46 in relationship to the second engraving head 24 so that, for example, a first pattern 12 may be engraved on a surface 44a of cylinder 44 and a second pattern of engraved areas 14 may be engraved on a surface 46a of cylinder 46. Thus, it should be appreciated that features of the present invention may be utilized with either a single or multiple-cylinder engraver 10.

A feature of the present invention is that it is capable of simultaneously engraving multiple patterns of engraved areas defining different screen rulings, such as the screens illustrated in FIG. 7, while the cylinder 16 (FIG. 1) or cylinders 44 and 46 (FIG. 2) are rotating along a common axis at substantially the same rotational speed. Another feature of this invention is that the drive system 28 is capable of independently driving the engraving heads 22 and 24 horizontally relative to the cylinder 16 (FIG. 1) or cylinders 44 and 46 (FIG. 2). This feature will now be described relative to FIGS. 3–7. For ease of illustration, the drive system 28 will be described relative to the embodiment illustrated in FIG. 1, but it should be appreciated that the same features are utilized with the embodiment shown in FIG. 2 as well.

The first and second engraving head drivers (FIG. 3) comprise drive assemblies 56 and 57, respectively, which comprise ball nut housings 58 and 59 defining stanchions or mounting surfaces 50a and 59a, respectively, on which the carriages 50 and 54 may be mounted. As shown in FIG. C, the housings 58 and 59 are mounted on a stationary leadscrew 60.

The drive assemblies 56 and 57 also comprise motors 62 and 63, respectively, which are coupled to the engraving head control system 20. A shaft 62a of motor 62 and a shaft 63a of motor 63 rotatably drive spur gears 64 and 65, respectively. As shown for ease of illustration in FIG. 4, the spur gear 64 or drive assembly 56 drives a rotating ball nut assembly 66 situated inside the housing 58. Thus, as spur gear 64 is driven by motor shaft 62a, it rotates to cause ball nut housing assembly 66 to rotate about axis 60a. This, in turn, causes housing 50 to move either left or right (as viewed in FIG. 4) depending on which direction motor 62 rotatably drives spur gear 64. Drive assembly 57 comprises substantially the same components which operate in substantially the same way to cause housing 59 and, consequently, engraving head 24 to move along leadscrew 60.

In the embodiment being described, the drive assemblies 56 and 57 (FIG. 3) may each comprise means for sensing the rotational movement of gears 64 and 65, respectively. For example, housing arm 68 in housing 50 may have a proximity sensor 70 which cooperates with a target 72 mounted on spur gear 64 to provide a one revolution proximity. The drive assembly 57 may comprise a similar arrangement with sensor 71 mounted on an arm 73 which cooperates with a target 75 to provide a one revolution proximity sensor. The motors 62 and 63 may also comprises encoder 74 and 77, respectively, which are coupled to computer 18 and which provide information as to the position of engraving heads 22 and 24 along leadscrew 60.

In the manner described later herein, the engraving head control system 20 may generate a first engraving head drive signal for energizing motor 62 which, in turn, drives gear 64 to rotatably drive the rotating ball nut assembly 66 in order to drive engraving head 22 axially along the stationary leadscrew 60. The manner of generating the first engraving head drive signal will be described later herein. Likewise, the engraving head control system 20 may generate a second engraving head drive signal for energizing motor 63 to drive gear 65 to move housing 59 and, consequently, engraving head 24 in substantially the same manner.

In this regard, features of U.S. Pat. No. 5,492,057, which is issued to the same assignee as the present invention and which is incorporated herein by reference and made a part hereof, may be utilized.

It should be appreciated that while the embodiments illustrated in FIGS. 1–4 illustrate the use of first and second engraving head drivers 30 and 32 which cooperate with a stationary leadscrew 60 to drive the first and second engraving heads 22 and 24, respectively, the engraving heads 22 and 24 may also be achieved by using driven leadscrews, such as leadscrews 80 and 82 (FIG. 6) which are independently coupled to and driven by a pair of stepper motors 84 and 86, respectively. The leadscrews 80 and 82 cooperate with non-rotating nuts (not shown) mounted underneath carriages 50 and 54 (FIG. 1), respectively, such that when the screws 80 and 82 are rotatably driven by motors 84 and 86, respectively, the engraving heads 22 and 24 traverse surface 16a of cylinder 16 in the direction of double arrow A in FIG. 1.

The engraving head control system 20 will now be described relative to FIG. 5 wherein a signal generator 90 is shown comprising a vertical scaler 92 and a horizontal scaler 94. In general, the vertical scaler 92 provides scaled AC sine waves for controlling movement of the stylus 22a situated on engraving head 22 and the tylus 24a situated on engraving head 24 in a predictable manner. The horizontal scaler 94 provides scaled first and second engraving head drive signals for energizing motors 62 and 63 for controlling movement of engraving heads 22 and 24, respectively.

A unique feature of this invention is that both vertical scaler 92 and horizontal scaler 94 generate separate signals using a cylinder factor corresponding to the cylinder 16. In the embodiment being described, the cylinder factor may be a rotational velocity or speed of cylinder 16, a rotational position of cylinder 16 or the like. In this regard, the cylinder driver 26 comprises an associated encoder 26a for generating an encoder signal or cylinder factor signal 99 (FIG. 8) comprising a predetermined number of uniformly-spaced reference positions for each revolution of cylinder 16. The encoder 26a generates 10000 pulses per revolution in the embodiment being described, but it should be appreciated that other encoders having different outputs may be selected.

Advantageously, each engraving head 22 and 24 is capable of engraving separate patterns of engraved areas 12 and 14 which define different screens. Because the screens for the patterns 12 and 14 (FIG. 7) are different, the number of engraved areas 12a for the pattern 12 in the vertical direction (i.e., the vertical screen) will be different from the vertical screen or number of engraved areas 14a defined by pattern 14. Advantageously, this invention provides means for synchronizing the vertical screen or number of cells required for each revolution to the rotational position of cylinder 16 using the vertical scaler 92 which will now be described.

The vertical scaler 92 (FIG. 5) comprises a first vertical scaler or phase lock 96 which is coupled to a first sine wave generator 98 as shown. The output of the first sine wave generator 98 is fed to a summing junction 100 which also receives a first video signal VS1 (FIG. 8) corresponding to a first image (not shown) to be engraved from computer 18. The summary junction 100 sums the signals and outputs a first engraving signal ES1 (FIG. 8) to engraving head 22 in a conventional manner so as to cause stylus 22a to engrave surface 16a of cylinder 16 with the first pattern of engraved areas 12 (FIG. 7) defining the first screen. The first vertical phase lock 96 receives as its input the output from encoder 26a and a first vertical scaling factor corresponding to the first screen. In the embodiment being described, the first vertical scaling factor may be loaded by computer 18 in response to screen variables corresponding to the first screen as input by a user. The components of the screen variables are described later herein.

The vertical scaler 92 further comprises a second vertical scaler or phase lock 104 which is coupled to a second sine wave generator 106 and which generates a sine wave which is fed to a second summing junction 108. The second summing junction receives a second video signal VS2 (FIG. 8) corresponding to a second image to be engraved (not shown) from computer 18. The output of the summing junction 108 will be a second engraving signal ES2 which is fed to engraving head 24 to cause stylus 24a to engrave the pattern of engraved areas 14 to define the second screen.

As with the first vertical scaler 96, the second vertical scaler 104 receives as its input the cylinder factor signal 99 (FIG. 8) from encoder 26a and a second vertical scaling factor from computer 18 which generates the second vertical scaling factor in response to screen variables corresponding to the second screen as input by the user.

The first and second vertical scalers 96 and 104 generate a first scaled signal and a second scaled signal 103 in response to the cylinder factor signal 99 received from encoder 26a and the first vertical scaling factor and second vertical scaling factor, respectively, generated by computer 18. The first and second scaled signals 101 and 103 are received by the sine wave generators 98 and 106, respectively, and a first sine wave 108 (FIG. 8) and second sine wave 109 (FIG. 8), respectively, are generated in response thereto.

As mentioned earlier herein the output of the sine wave generators 98 and 106 (i.e., the sine waves 108 and 110 in FIG. 8) are fed into the summing junctions 100 and 108, respectively, and summed with the video signals VS1 and VS2 to generate the first engraving head drive signal 105 for energizing the first engraving head 22 and a second engraving head drive signal 107 for energizing the second engraving head 24.

In the embodiment being described, the computer 18 generates the first vertical scaling factor and second vertical scaling factor for use by phase locks 96 and 104, respectively, using the following equation:

$$VSF = \frac{CX(\text{Desired cells/rev for screen being engraved})}{RPR}$$

where RPR=reference positions per revolution (from encoder 26a)
VSF=Vertical scaling factor 1
C=Is a constant to allow integer math to be used (160 in the examples)

It should be appreciated that the user inputs the screen variables, such as screen angle SA and screen ruling SR, into computer 18 which, in turn, generates the first and second vertical scaling factors for use by the first and second vertical scalers 96 and 104, respectively. Alternatively, the user may determine and input the first and second vertical scaling factors directly into the first and second vertical scalers 96 and 104, respectively.

In the embodiment being described, the first and second scalers 96 and 104 generate the first and second scaled signals 101 and 103 or output clocks which scale or synchronize the frequency of engraving heads 22 and 24 to the output of encoder 26a. This ensures that the correct vertical screen (or number of engraved areas for each vertical column of engraved areas) are engraved during each revolution of the cylinder 16 even if the cylinder speed is varying.

In the embodiment being described, the first and second vertical scalers 96 and 104 generate the clocked output first and second scaling signals 101 and 103 of 160 times for each pulse generated by encoder 26a. It should be appreciated that the first and second vertical scalers 96 and 104 may be selected to have a different output clock rate depending on the output frequency of the encoder 26a being used. In the embodiment being described, it is desirable to have the engraving head 22 operate at a frequency of about 4500 Hz, and this frequency is used to regulate rotational speed via a speed control 110 which will now be described.

The engraving system 10 further comprises a speed control 110 which receives the output from sine wave generator 98 and a desired speed from computer 18 to provide closed loop feedback control for varying the speed of rotation of cylinder 16 such that the first sine wave generator 98 will ultimately generate approximately a 4500 Hz signal, thereby further facilitating causing the engraving head 22 to engrave at the desired frequency. In this embodiment, the engraving head 24 may operate at a different frequency.

The user may independently or selectively change the horizontal screen for the engraving heads, regardless of whether the vertical screen for each head is different. The apparatus associated with this feature will now be described.

The signal generator 90 comprises the horizontal scaler 94 which may be selectively used either independently or simultaneously with vertical scaler 92. The horizontal scaler 94 comprises a first horizontal scaler or phase lock 112 and second horizontal scaler or phase lock 114 which generate the first engraving head drive signal 105 and the second engraving head drive signal 107, respectively. The first and second engraving head drive signals 105 and 107 are received by motors 62 and 63, respectively, which cause their respective engraving heads 22 or 24 to be driven along leadscrew 60 in the manner described earlier herein. This facilitates independent control of the horizontal movement of engraving heads 22 and 24 so as to facilitate engraving the first and second patterns of engraved areas 12 and 14, respectively, defining different screens. In general, the engraving head control system 20 utilizes the cylinder factor signal 99 from encoder 26a to synchronize movement of the engraving heads 22 and 24 in response to a first horizontal scaling factor and a second horizontal scaling factor which are either generated by or received by computer 18. Thus, note that the first horizontal scaler 112 and second horizontal scaler 114 receive the output from encoder 26a as well as the first horizontal scaling factor and the second horizontal scaling factor, respectively. The first and second horizontal scaling factors are received from computer 18 and correspond or correlate to the screen variables, such as screen angle and screen ruling, selected by the user. Computer 18 determines the first and second horizontal scaling factors using the following equation:

$$HSF = \frac{RPR * C}{HPR}$$

where RPR=reference positions per revolution as represented by the cylinder factor signal 99 from encoder 26a
C=Constant to allow integer math
HSF=Horizontal screen factor
HPR=Horizontal pulses per revolution into the servo system. In this example, 1 pulse moves the head ~1 micron horizontally.

$$HPR = \left[\frac{\text{\# of pulses per rev of servo motor} * \text{gear reduction}}{\text{pitch of ballscrew (microns/rev)}}\right] \times \left[\frac{\text{horiz spacing of screen}}{2}\right]$$

In general, based upon the screen variables selected by the user, computer 18 also calculates a predetermined feed distance PFD required to move each engraving head 22 and 24 horizontally for each revolution of cylinder 16. The predetermined feed distance PFD corresponds to the horizontal feed or slew rate per revolution of cylinder 16. Computer 18 determines the first and second horizontal scaling factors which are provided to the first and second horizontal scalers 112 and 114 so that for each revolution, the correct number of step pulses is generated by the first and second horizontal scalers 112 and 114, respectively, to energize drive motors 62 and 63, respectively.

Because the screen variables, such as the screen angle and screen ruling, selected by the user for the engraving heads 22 and 24 are different, the distance each engraving head 22 and 24 is driven horizontally during each rotation will be different. The determination of the predetermined horizontal feed distance PFD is determined by the following equations:

$$PFD = \frac{HS}{2}$$

Where=PFD is the predetermined feed distance HS is the horizontal spacing for the screen being engraved Advantageously, this system provides means for engraving a plurality of patterns of engraved areas 12 and 14 defining different screen rulings using multiple engraving heads 22 and 24, despite the fact that the engraving heads 22 and 24 engraved while the rotational speed of the cylinder 16 (FIG. 1) or cylinders 44 and 46 (FIG. 2) is the same.

FIG. 6 illustrates another embodiment of the invention showing the plurality of leadscrews 80 and 82 which are independently driven by leadscrew drive motors 84 and 86, respectively, and which cooperate with non-rotating nuts (not shown) mounted underneath carriages 50 and 54, respectively, so that the engraving heads 22 and 24 can be independently and selectively driven horizontally across the surface 16a of cylinder 16 in the direction of double arrow A (FIG. 1). In this regard, features of U.S. Pat. No. 5,492,057, which is issued to the same assignee as the present invention and which is incorporated herein by reference and made a part hereof, may be utilized. The features of the engraving head control system 20 as shown and described above relative to FIG. 5 may also be utilized to control the operation of the leadscrew drive motors 84 and 86 to drive engraving heads 22 and 24 to engrave the plurality first and second patterns of engraved areas 12 and 14.

The features of the embodiments shown in FIGS. 5 and 6 may also be utilized with an engraving system which engraves multiple cylinders, such as cylinders 44 and 46 in FIG. 2. The cylinders 44 and 46 are rotatably mounted using the stocks 38, 40 and 42 so that the cylinders 44 and 46 are rotatably positioned in operative relationship with the first and second engraving heads 22 and 24, respectively. The features of the invention described relative to FIGS. 5 and 6 may be utilized to control the operation and/or movement of the first and second engraving heads 22 and 24 in order to engrave patterns of engraved areas defining differing screen rulings in the manner described earlier herein.

It should be appreciated that various combinations of features and other embodiments are contemplated by the apparatus of the present invention. For example, multiple engraving heads 22 and 24 could be positioned on carriages 50 and 54 in either the embodiment shown in FIG. 1 or FIG. 2 so that the engraving system 10 can engrave multiple patterns having differing screens on either a single cylinder, such as cylinder 16 (FIG. 1), or multiple cylinders, such as cylinders 44 and 46 (FIG. 2). Multiple engraving areas defining different screens may also be engraved on the same cylinder in the single or dual-cylinder system.

Advantageously, this invention provides a system and method by which either one cylinder or a plurality of cylinders which are located on a common rotational axis and which are driven at the same speed can be engraved using differing engraving screens by, for example, varying the frequency of operation of engraving head 22 and/or engraving head 24 and/or independently controlling the horizontal velocity or slew rate of the carriages 50 and 54 (FIG. 1) upon which the engraving heads 22 and 24, respectively, are mounted. The methodology for utilizing the features of the invention as described herein will now be described.

FIG. 10 illustrates a screen EH-1 defined by engraved areas 201 engraved using engraving head 22. A screen EH-2 is also shown as defined by engraved areas 203 engraved using engraving head 24. Notice that the horizontal width HW-1 and vertical dimension VH-1 for screen EH-1 are different than the horizontal width HW-2 and vertical dimension H-2 for screen EH-2. This variability of both vertical and horizontal revolutions facilitates changing the screen angle and screen. Alternatively, it is possible to keep the screen and/or density of engraved areas engraved by heads 22 and 24 the same while changing the screen angle by altering or changing the horizontal width HW-1 or HW-2.

For ease of illustration, the method will be described relative to the embodiment shown in FIG. 1 where an operator rotatably mounts the cylinder 16 between the headstock 34 and tailstock 36. The first engraving head 22 and second engraving head 24 are situated in operative relationship with the surface 16a of the cylinder 16. In this regard, the engraving system 10 may include drivers (not shown) mounted on carriages 50 and 54 of the type conventionally known for moving the engraving heads 22 and 24 towards and away from the surface 16a of cylinder 16.

The cylinder factor signal 99 (FIG. 8) corresponding to cylinder position or cylinder speed is generated by encoder 26a (FIG. 5). In the embodiment being described, the cylinder factor signal 99 corresponds to the rotational position of cylinder 16. The first and second engraving heads 22 and 24 are synchronized to the cylinder factor signal 99 using the first and second vertical scalers 96 and 104 (FIG. 5), as mentioned earlier herein.

The first and second scaling factors mentioned earlier herein are determined or calculated by computer 18 (FIG. 1) and fed into the first vertical 96 (FIGS. 5 and 6) and second vertical scaler 104, respectively, along with the cylinder factor signal 99 (FIG. 8). As mentioned earlier herein, the first and second scaling factors are determined for each pattern of engraved areas using the aforementioned Equations and in response to the screen variables, such as screen angle and screen ruling, which are defined by the user.

The first vertical scaler 96 (FIGS. 5 and 6) uses the first scaling factor to generate the first scaled signal 101 (FIG. 8) for use in generating the first engraving signal ES1 for energizing the first engraving head 22 to engrave the first pattern of engraved areas 12. Substantially simultaneously therewith, the second vertical scaler 104 generates the second scaled signal 103 which is used to generate the second engraving signal ES2 for energizing the second engraving head 24.

At the same time or independently from the vertical scaling, the engraving head control system 20 may independently or simultaneously control the horizontal movement of engraving heads 22 and 24 using the horizontal scaler 94. As mentioned earlier herein, the first horizontal scaling factor and second horizontal scaling factor corresponding to the first screen and second screen, respectively, are determined by computer 18 and/or provided by a user in accordance with the aforementioned Equations. For example, the computer 18 may generate the first and second horizontal scaling factors in response to the screen variables, such as screen ruling and screen angle, input into computer 18 by the user.

The first and second horizontal scalers 112 and 114 receive their respective first and second horizontal scaling factors and generate the first engraving head drive signal 105 (FIG. 8) and second engraving head drive signal 107, respectively, in response thereto. The engraving head control system 20 utilizes the first and second engraving head drive signals 105 and 107 to energize drive motors 62 and 63 (FIG. 3) to effect independent and horizontal movement (i.e., in a direction generally parallel to the axis of rotation of cylinder 16) of engraving heads 22 and 24 as mentioned earlier herein.

As was also mentioned earlier herein, the encoder 26a (FIG. 5) provides a sensed measurement of the cylinder factor in the embodiment now being described, which is the rotational position of cylinder 16. The first and second horizontal scalers 112 and 114 synchronize the movement of engraving heads 22 and 24 to the rotation of cylinder 16 which simultaneously accounts for the differing screen variables, such as screen angle and screen ruling, corresponding to the patterns 12 and 14 (FIG. 7).

Advantageously, this system and method provide means for engraving differing screens on the same or on multiple cylinders while the cylinder or cylinders rotate at the same rotational speed. The system and method effectively enables the user to synchronize the frequency and engraving of the engraving heads 22 and 24 to the rotation of the cylinder 16. While the method and apparatus have been described as utilizing both vertical adjustment and horizontal control, it should be appreciated that these features may be selectively used either together or independently on either a single or multi-cylinder engraver. This enables the engraving heads 22 and 24 to engrave differing vertical screens within their respective engraving channels and different horizontal screens as the engraving heads 22 and 24 are independently moved at different predetermined feed rates as desired. Also, while the engraving heads 22 and 24 may be moved at substantially the same rate, the system and method of the present invention facilitate selectively engraving differing vertical screens within a channel or line of engraved areas on the same cylinder in the manner described herein. Thus, the user may select either vertical screen adjustment, horizontal screen adjustment or simultaneous vertical and horizontal adjustment to effect engraving differing patterns of engraved areas defining differing screens on either a single or multi-cylinder engraver.

In this regard, the screened patterns 12 and 14 shown in FIG. 7 are illustrative only and it should be appreciated that other patterns defining other screens may be engraved. For example, non-screened or intaglio engraved areas may be engraved with one head, while screened areas are engraved on another head. Moreover, a helical pattern could be engraved with one head while a stepover pattern is engraved with another. Because the heads are independently controllable, the invention provides means for engraving patterns having a constant density using the same screen while the screen angle changes.

While the methods herein described, and the forms of apparatus for carrying these methods into effect, constitute preferred embodiments of this invention, it is to be understood that the invention is not limited to these precise methods and forms of apparatus. Thus changes may be made in either without departing from the scope of the invention, which is defined in the appended claims.

What is claimed is:

1. An engraving head control system for independently controlling the operation of each a plurality of engraving heads on an engraver such that said engraving heads can engrave a plurality of patterns, respectively, of engraved areas defining different horizontal screen widths on at least one cylinder rotatably mounted on said engraver, said engraving head control system comprising:

a signal generator for generating a plurality of engraving head signals for energizing said plurality of engraving heads to engrave said plurality of patterns.

2. The engraving head control system as recited in claim 1 wherein said signal generator generates said plurality of engraving head signals in response to a cylinder factor, said engraving head control system further comprising:

a sensor for sensing said cylinder factor and for generating a cylinder factor signal in response thereto;

a scaler coupled to said sensor for receiving said cylinder factor signal and for scaling said cylinder factor signal to provide a plurality of scaled signals for generating said plurality of engraving signals.

3. The engraving head control system as recited in claim 2 wherein said scaler comprises:

a plurality of vertical scalers for receiving said cylinder factor signal and a plurality of vertical scaling factors corresponding to said plurality of patterns and for generating a plurality of scaled signals, respectively, in response thereto;

a plurality of waveform generators coupled to said plurality of vertical scalers, respectively, for receiving said plurality of vertical scaling factors and for generating a plurality of waveforms in response thereto.

4. The engraving head control system as recited in claim 3 wherein said plurality of vertical scalers comprises a plurality of phase locks coupled to said plurality of waveform generators, respectively.

5. The engraving head control system as recited in claim 3 wherein said plurality of patterns define at least a first engraving screen and a second engraving screen; said plurality of vertical scaling factors comprise a first scaling factor associated with said first engraving screen and a second scaling factor associated with said second engraving screen, wherein said first scaling factor is larger than said second scaling factor.

6. The engraving head control system as recited in claim 3 wherein said plurality of patterns define a first engraving screen and a second engraving screen; said plurality of scaling factors comprise a first scaling factor associated with said first engraving screen and a second scaling factor associated with said second engraving screen, wherein said plurality of scaled signals comprise a first scaled signal which is a multiple of said cylinder factor and a second scaled signal which is also a multiple of said cylinder factor.

7. The engraving head control system as recited in claim 2 wherein said engraver comprises a cylinder driver for rotatably driving said cylinder at a rotational speed, said cylinder factor corresponding to said rotational speed;

said cylinder driver comprising an encoder associated therewith for generating a predetermined number of pulses per revolution of said cylinder;

said plurality of scaling factors comprising a first scaling factor associated with said first engraving screen and a second scaling factor associated with said second engraving screen;

wherein said first and second scaling factors are each a multiple of said predetermined number of pulses.

8. The engraving head control system as recited in claim 3 wherein each of said plurality of vertical scaling factors comprise a multiplier determined by the following equation:

$$VSF = \frac{CX(\text{Desired cells/rev for screen being engraved})}{RPR}$$

where RPR=reference positions per revolution
VSF=Vertical scaling factor
C=A constant to allow integer math.

9. The engraving head control system as recited in claim 2 wherein said plurality of engraving heads are coupled to a plurality of engraving head drivers, respectively, for driving said plurality of engraving heads a plurality of predetermined feed rates during engraving, said scaler further comprising:

a plurality of horizontal scalers coupled to said plurality of engraving head drivers for receiving said cylinder factor signal and a plurality of horizontal scaling factors corresponding to said plurality of patterns, respectively, and for energizing said plurality of engraving head drivers to drive said plurality of engraving heads in response thereto in order to engrave said plurality of patterns.

10. The engraving head control system as recited in claim 9 wherein each of said scaling factors are determined by the following:

$$HSF = \frac{RPR * C}{HPR}$$

where RPR=reference positions per revolution
C=Constant to allow integer math
HSF=Horizontal screen factor
HPR=Horizontal pulses per revolution $$HPR = \left[\frac{\text{\# of pulses per rev of servo motor} * \text{gear reduction}}{\text{pitch of ballscrew (microns/rev)}}\right] \times \left[\frac{\text{horiz spacing of screen}}{2}\right]$$

11. The engraving head control system as recited in claim 9 wherein at least one of said plurality of predetermined feed distances is determined by the following equation:

$$PFD = \frac{HS}{2}$$

Where=PFD is the predetermined feed distance HS is the horizontal spacing for the screen being engraved.

12. The engraving head control system as recited in claim 9 wherein said plurality of horizontal scalers comprises a plurality of phase locks coupled to said plurality of drivers.

13. The engraving head control system as recited in claim 11 wherein said engraving head control system comprises an encoder coupled to a cylinder driver for driving said cylinder, said encoder generating said reference positions in the form of a plurality of pulses for each revolution of said cylinder.

14. The engraving head control system as recited in claim 1 wherein said cylinder factor corresponds to a rotational speed of said cylinder.

15. The engraving head control system as recited in claim 1 wherein said cylinder factor corresponds to a rotational position of said cylinder.

16. An engraving system for engraving a first screen pattern of engraved areas defining a first angle and a second pattern of engraved areas defining a second screen angle; wherein said first and second engraved areas define different screen widths said engraver comprising:
- a computer for controlling the operation of the engraver;
- a cylinder support situated on said engraver for rotatably supporting at least one cylinder on said engraver;
- a cylinder driver coupled to said computer for rotatably driving said at least one cylinder;
- a first engraving head for engraving said first pattern of engraved areas defining said first screen angle;
- a second engraving head for engraving said second pattern of engraved areas defining said second screen angle, wherein a first screen width defined by said first screen angle and a second screen width defined by said second screen angle are different;
- a drive system for independently driving said first and second engraving heads across a surface of said at least one cylinder in order to engrave said first and second pattern of engraved areas on said at least one cylinder; and
- an engraving head control coupled to said computer, said first and second engraving heads, said cylinder driver and said drive system for independently controlling the operation of said first and second engraving heads such that said first and second engraving heads engrave said first and second pattern of engraved areas on said at least one cylinder.

17. The engraving system as recited in claim 16 wherein said engraving head control further comprises:
- a signal generator for generating a plurality of engraving head signals for energizing said first and second engraving heads to engrave said first and second patterns of engraved areas, respectively, in response to a cylinder factor.

18. The engraving system as recited in claim 16 wherein said signal generator further comprises:
- a sensor for sensing said cylinder factor and for generating a cylinder factor signal in response thereto;
- a scaler coupled to said sensor for receiving said cylinder factor signal and for scaling said cylinder factor signal to provide a first scaled signal and a second scaled signal and also for using said first and second scaled signals to generate a first engraving signal and a second engraving signal, respectively, for energizing said first and second engraving heads.

19. The engraving system as recited in claim 18 wherein said scaler comprises:
- a first vertical scaler for receiving said cylinder factor signal and a first vertical scaling factor corresponding to said first screen and for generating said first scaled signal in response thereto and a second scaling factor for receiving said cylinder factor signal and a second vertical scaling factor corresponding to said second screen and for generating said second scaled signal in response thereto.

20. The engraving system as recited in claim 19 wherein said engraving head control further comprises:
- a first waveform generator and a second waveform generator coupled to said first and second vertical scalers, respectively, for receiving said first and second vertical scaling factors and for generating a first waveform and a second waveform, respectively, in response thereto.

21. The engraving system as recited in claim 19 wherein said first and second vertical scalers each comprise a phase lock.

22. The engraving system as recited in claim 19 wherein said first vertical scaling factor is larger than said second vertical scaling factor.

23. The engraving system as recited in claim 19 wherein said first and second vertical scaling factors are directly proportional to said cylinder factor.

24. The engraving system as recited in claim 17 wherein said cylinder driver comprises an encoder for generating a predetermined number of pulses per revolution of said cylinder which defines said cylinder factor;
- wherein said first and second scaling factors comprise a multiple of said predetermined number of pulses.

25. The engraving system as recited in claim 24 wherein said multiple is determined by the following equation:

$$VSF = \frac{CX(\text{Desired cells/rev for screen being engraved})}{RPR}$$

where RPR=reference positions per revolution
VSF=Vertical scaling factor
C=A constant to allow integer math.

26. The engraving system as recited in claim 16 wherein said drive system further comprises a first engraving head driver associated with said first engraving head for driving said first engraving head a first predetermined feed distance and a second engraving head driver associated with said second engraving head for driving said second engraving head a second predetermined feed distance, said engraving head control further comprising:
- a first horizontal scaler coupled to said first engraving head driver and a second horizontal scaler coupled to said second engraving head driver;
- said first horizontal scaler being capable of receiving a cylinder factor and a first horizontal scaling factor corresponding to said first screen and also for generating a first engraving head drive signal in response thereto;
- said second horizontal scaler being capable of receiving said cylinder factor and a second horizontal scaling factor corresponding to said second screen and generating a second engraving head drive signal in response thereto.

27. The engraving system as recited in claim 16 wherein said drive system further comprises:
- at least one linear motor for driving at least one of said first engraving head or second engraving head in response to said engraving head control.

28. The engraving system as recited in claim 18 wherein said engraving system further comprises:
- a first engraving head driver associated with said first engraving head for driving said first engraving head a first predetermined feed distance and a second engraving head driver associated with said second engraving head for driving said second engraving head at a second predetermined feed distance, said engraving head control further comprising:
- a first horizontal scaler coupled to said first engraving head driver and a second horizontal scaler coupled to said second engraving head driver;
- said first horizontal scaler being capable of receiving said cylinder factor and a first horizontal scaling factor corresponding to said first screen and also for generating a first engraving head drive signal in response thereto;

said second horizontal scaler being capable of receiving said cylinder factor and a second horizontal scaling factor corresponding to said second screen and also for generating a second engraving head drive signal in response thereto.

29. The engraving system as recited in claim 26 wherein said first and second scaling factors are determined using the following equation:

$$HSF = \frac{RPR * C}{HPR}$$

where RPR=reference positions per revolution
C=Constant to allow integer math
HSF=Horizontal screen factor
HPR=Horizontal pulses per revolution $$HPR = \left[\frac{\text{\# of pulses per rev of servo motor} * \text{gear reduction}}{\text{pitch of ballscrew (microns/rev)}}\right] \times \left[\frac{\text{horiz spacing of screen}}{2}\right]$$

30. The engraving system as recited in claim 26 wherein said first and second predetermined feed distances are determined by the following equation:

$$PFD = \frac{HS}{2}$$

Where=PFD is the predetermined feed distance HS is the horizontal spacing for the screen being engraved.

31. The engraving system as recited in claim 28 wherein said first and second scaling factors are determined using the following equation:

$$HSF = \frac{RPR * C}{HPR}$$

where RPR=reference positions per revolution
C=Constant to allow integer math
HSF=Horizontal screen factor
HPR=Horizontal pulses per revolution $$HPR = \left[\frac{\text{\# of pulses per rev of servo motor} * \text{gear reduction}}{\text{pitch of ballscrew (microns/rev)}}\right] \times \left[\frac{\text{horiz spacing of screen}}{2}\right]$$

32. The engraving system as recited in claim 28 wherein said first and second predetermined feed distances are determined by the following equation:

$$PFD = \frac{HS}{2}$$

Where=PFD is the predetermined feed distance HS is the horizontal spacing for the screen being engraved.

33. The engraving system as recited in claim 26 wherein said first and second horizontal scalers each comprise a phase lock.

34. The engraving system as recited in claim 16 wherein said drive system comprises:

a first engraving head driver coupled to said computer and said first engraving head for driving said first engraving head a first predetermined feed distance in order to engrave said first pattern of engraved areas and a second engraving head driver coupled to said computer and said second engraving head for independently driving said second engraving head a second predetermined feed distance in order to engrave said second pattern of engraved areas.

35. The engraving system as recited in claim 34 wherein said first and second predetermined feed distances are determined in accordance with the following equation:

$$PFD = \frac{HS}{2}$$

Where=PFD is the predetermined feed distance HS is the horizontal spacing for the screen being engraved.

36. The engraving system as recited in claim 35 wherein said multiplier is determined by the following equation:

$$HSF = \frac{RPR * C}{HPR}$$

where RPR=reference positions per revolution
C=Constant to allow integer math
HSF=Horizontal screen factor
HPR=Horizontal pulses per revolution.

$$HPR = \left[\frac{\text{\# of pulses per rev of servo motor} * \text{gear reduction}}{\text{pitch of ballscrew (microns/rev)}}\right] \times \left[\frac{\text{horiz spacing of screen}}{2}\right]$$

37. The engraving system as recited in claim 16 wherein said at least one cylinder comprises a single cylinder, said cylinder support further comprising:

a headstock and a tailstock for rotatably supporting a cylinder so that said first pattern of engraved areas and said at least one second pattern of engraved areas may be engraved on a surface of said single cylinder.

38. The engraving system as recited in claim 16 wherein said at least one cylinder comprises a first cylinder and a second cylinder, said cylinder support further comprising:

a plurality of stocks cooperating to rotatably support a first cylinder in relationship to said first engraving head and a second cylinder in relationship to said second engraving head so that said first pattern of engraved areas may be engraved on a surface of said first cylinder by said first engraving head and said at least one second pattern of engraved areas may be engraved on a surface of said second cylinder by said second engraving head.

39. The engraving system as recited in claim 17 wherein said cylinder factor corresponds to a rotational speed of said cylinder.

40. The engraving system as recited in claim 17 wherein said cylinder factor corresponds to a rotational position of said cylinder.

41. A method for simultaneously engraving a first pattern defining a first screen defining a first screen width using a first engraving head and a second pattern defining a second screen defining a second screen width using a second engraving head on at least one cylinder, wherein said first and second screen widths are different; said method comprising the steps of:

rotatably driving said at least one cylinder at a cylinder rate; and independently controlling the operation of said first and second engraving heads in response to said cylinder rate in order to effect said simultaneous engraving of said first and second patterns.

42. The method as recited in claim 41 wherein said controlling step further comprises the steps of:

generating a first vertical scaler for said first screen and a second vertical scaler for said second screen;

applying said first vertical scaler and said second vertical scaler to said cylinder rate to provide a first scaled signal and a second scaled signal, respectively;

using said first and second scaled signals to generate a first engraving signal for energizing said first engraving head to engrave said first engraved pattern and a second engraving signal for energizing said second engraving head to engrave said second engraved pattern during rotation of said at least one cylinder.

43. The method as recited in claim 42 wherein said cylinder rate comprises a number of reference positions for each revolution of said at least one cylinder.

44. The method as recited in claim 43 wherein said method further comprises the steps of:

driving said at least one cylinder at said cylinder rate using a cylinder driver;

generating said number of reference positions using an encoder coupled to said cylinder driver.

45. The method as recited in claim 41 wherein said applying step further comprises the steps of:

determining a first number of engraved areas per revolution for said first screen and a second number of engraved areas per revolution for said second screen;

synchronizing said first and second engraving heads to said cylinder rate using said first and second numbers of engraved patterns.

46. The method as recited in claim 45 wherein said method further comprises the steps of:

using an encoder to generate a number of reference positions for each revolution of said at least one cylinder;

using said number of pulses to generate a first waveform corresponding to said first screen and a second waveform corresponding to said second screen.

47. The method as recited in claim 41 wherein said method further comprises the steps of:

generating a first vertical scaler corresponding to said first screen and a second vertical scaler corresponding to said second screen;

loading said first vertical scaler into a first phase lock and said second vertical scaler into a second phase lock;

using said first and second phase locks to synchronize said first and second screens to said cylinder rate;

generating a first waveform and a second waveform in response to said using step.

48. The method as recited in claim 41 wherein said method further comprises the steps of:

sensing said cylinder rate of said at least one cylinder and generating a cylinder rate signal in response thereto;

scaling said cylinder rate signal to provide a first scaled signal corresponding to said first screen and a second scaled signal corresponding to said second screen;

using said first and second scaled signals to generate a first engraving signal and a second engraving signal, respectively.

49. The method as recited in claim 48 wherein said sensing step further comprises the step of:

using an encoder to generate said cylinder rate in the form of a plurality of encoder pulses for each revolution of said at least one cylinder.

50. The method as recited in claim 48 wherein said scaling step further comprises the step of:

using a first scaling factor to generate said first scaled signal and a second scaling factor to generate said second scaled signal.

51. The method as recited in claim 48 wherein said scaling step further comprises the steps of:

loading said first scaling factor and said cylinder rate into a first phase lock which also receives said cylinder rate signal and generates said first scaled signal in response thereto;

loading said second scaling factor and said cylinder rate into a second phase lock which also receives said cylinder rate signal and generates said second scaled signal in response thereto.

52. The method as recited in claim 50 wherein said using step further comprises the step of:

using the following formula to generate at least one of said first and second scaling factors:

$$VSF = \frac{CX(\text{Desired cells/rev for screen being engraved})}{RPR}$$

where RPR=reference positions per revolution
VSF=Vertical scaling factor
C=A constant to allow integer math.

53. The method as recited in claim 41 wherein said controlling step further comprises the step of:

controlling movement of said first and second engraving heads to facilitate engraving said first and second patterns.

54. The method as recited in claim 53 wherein said method further comprises the step of:

controlling movement of at least one of said first and second engraving heads using a linear motor.

55. The method as recited in claim 53 wherein said using step further comprises the step of:

synchronizing movement of said first and second engraving heads to the rotation of said at least one cylinder in order to engrave said first and second engraved patterns.

56. The method as recited in claim 55 wherein said synchronizing step further comprises the steps of:

determining a first horizontal scaling factor corresponding to said first screen to synchronize movement of said first engraving head and a second horizontal scaling factor corresponding to said second screen to synchronize movement of said second engraving head;

using said first and second horizontal scaling factors and said cylinder rate to generate a first engraving head drive signal for driving said first engraving head a first engraving head feed distance and a second engraving head drive signal for driving said second engraving head a second engraving head feed distance, wherein said first and second engraving head feed distance are different.

57. The method as recited in claim 56 wherein said cylinder rate comprises a plurality of pulses correlating to a revolution of said at least one cylinder, said determining step further comprising the step of:
generating said cylinder rate using an encoder.

58. The method as recited in claim 55 wherein said at least one of said first and second scaling factors is determined using the following equation:

$$HSF = \frac{RPR * C}{HPR}$$

where RPR=reference positions per revolution
C=Constant to allow integer math
HSF=Horizontal screen factor
HPR=Horizontal pulses per revolution $$HPR = \left[\frac{\text{\# of pulses per rev of servo motor} * \text{gear reduction}}{\text{pitch of ballscrew (microns/rev)}}\right] \times \left[\frac{\text{horiz spacing of screen}}{2}\right]$$

59. The method as recited in claim 56 wherein said at least one of said first engraving head feed rate or said second engraving head feed rate is determined using the following formula:

$$PFD = \frac{HS}{2}$$

Where=PFD is the predetermined feed distance HS is the horizontal spacing for the screen being engraved.

60. The method as recited in claim 55 wherein said synchronizing step further comprises the step of:
using a plurality of phase locks to synchronize the movement of said first and second engraving heads.

61. A method for engraving at least one cylinder with a first engraved pattern defining a first screen defining a first screen width and a second engraved pattern defining a second screen defining a second screen width while said cylinder is rotating, comprising the steps of:
rotatably mounting said at least one cylinder on an engraver;
situating a first engraving head in operative relationship with said at least one cylinder;
situating a second engraving head in operative relationship with said at least one cylinder;
determining a cylinder factor and generating a cylinder factor signal in response thereto;
synchronizing operation of said first engraving head using said cylinder factor signal and generating a first engraving signal for engraving said first engraved pattern in response thereto; and
synchronizing operation of said second engraving head using said cylinder factor signal and generating a second engraving signal for engraving said second engraved pattern in response thereto; wherein said first and second screen widths are different.

62. The method as recited in claim 61 wherein said cylinder factor comprises a predetermined number of pulses for each revolution of said at least one cylinder, said determining step further comprising the step of:
using an encoder associated with a drive motor for rotatably driving said at least one cylinder to generate said predetermined number of pulses.

63. The method as recited in claim 61 wherein said method further comprises the step of:
determining a first scaling factor for said first screen and a second scaling factor for said second screen;
using said first and second scaling factors to perform said synchronizing steps.

64. The method as recited in claim 61 wherein said method further comprises the step of:
using a first phase lock to perform said first synchronizing step and a second phase lock to perform said second synchronizing step.

65. The method as recited in claim 64 wherein said cylinder factor comprises a predetermined number of pulses for each revolution of said at least one cylinder, said sensing step further comprising the step of:
using an encoder associated with a drive motor for rotatably driving said at least one cylinder to generate said predetermined number of pulses.

66. The method as recited in claim 64 wherein said using step further comprises the step of:
loading a first scaling factor corresponding to said first screen into said first phase lock and a second scaling factor corresponding to said second screen into said second phase lock.

67. The method as recited in claim 66 wherein said loading step further comprises the step of:
using the following equation to determine at least one of said first or second scaling factors:

$$VSF = \frac{CX(\text{Desired cells/rev for screen being engraved})}{RPR}$$

where RPR=reference positions per revolution
VSF=Vertical scaling factor
C=A constant to allow integer math.

68. The method as recited in claim 61 wherein said method further comprises the step of:
independently controlling movement of said first and second engraving heads to perform said synchronizing steps using said cylinder factor.

69. The method as recited in claim 68 wherein said method further comprises the step of:
generating a first horizontal scaling factor corresponding to said first screen and a second horizontal scaling factor corresponding to said second screen;
using said first and second horizontal scaling factors to perform said controlling step.

70. The method as recited in claim 69 wherein said using step further comprises the step of:
generating a first engraving head drive signal for energizing a first engraving head driver associated with said first engraving head in response to said first horizontal scaling factor and said cylinder factor;
generating a second engraving head drive signal for energizing a second engraving head driver associated with said second engraving head in response to said second horizontal scaling factor and said cylinder factor; and using said first and second engraving head drive signals to energize said first and second engraving head drivers, respectively, in order to effect engraving of said first and second engraved patterns.

71. The method as recited in claim 61 wherein said method further comprises the step of:

using a first horizontal phase lock to synchronize the operation of said first engraving head in response to said cylinder factor signal and a second phase lock to synchronize the operation of said second engraving head in response to said cylinder factor signal.

72. The method as recited in claim 71 wherein said cylinder factor comprises a predetermined number of pulses, said sensing step further comprising the step of:

using an encoder associated with a drive motor for rotatably driving said at least one cylinder to generate said predetermined number of pulses.

73. The method as recited in claim 61 wherein said determining step further comprises the step of:

determining a cylinder rotational speed to define said cylinder factor.

74. The method as recited in claim 61 wherein said determining step further comprises the step of:

determining a cylinder position to define said cylinder factor.

* * * * *